United States Patent [19]
Riley et al.

[11] Patent Number: 5,737,723
[45] Date of Patent: Apr. 7, 1998

[54] CONFUSABLE WORD DETECTION IN SPEECH RECOGNITION

[75] Inventors: Michael Dennis Riley, New York, N.Y.; David Bjorn Roe, Berkeley Heights, N.J.

[73] Assignee: Lucent Technologies Inc., Murray Hill, N.J.

[21] Appl. No.: 297,283

[22] Filed: Aug. 29, 1994

[51] Int. Cl.$^6$ ........................................ G10L 9/00
[52] U.S. Cl. ........................................ 704/243; 704/244
[58] Field of Search ........................ 395/2.52, 2.53, 395/2.54, 2.56, 2.61, 2.49

[56] References Cited

U.S. PATENT DOCUMENTS

| | | | |
|---|---|---|---|
| 4,718,094 | 1/1988 | Bahl et al. | 381/43 |
| 4,972,485 | 11/1990 | Dautrich et al. | 381/43 |
| 5,329,608 | 7/1994 | Bocchieri | 395/252 |
| 5,452,397 | 9/1995 | Ittycheriah et al. | 395/2.49 |

OTHER PUBLICATIONS

L. R. Bahl et al., "Constructing Groups Of Acoustically Confusable Words," *IEEE International Conference On Acoustics Speech, and Signal Processing (ICASSP)* Apr. 1990, pp. 85–88.

C. Coker, "A dictionary–intensive letter–to–sound program," *J. Acoust. Soc. Am.*, vol 78, Suppl. 1, S7, 1985, pp.

T. Waardenburg et al., "The Automatic Recognition Of Stop Consonants Using Hidden Markov Models," *Proceedings of ICASSP*, 1992, pp. 585–588.

L.R. Bahl et al., "Automatic Phoneic Baseform Determination," *Proceedings of ICASSP*, May 1991, pp. 173–176.

S. Kimura et al., "Boosting The Accuracy Of A 100,000–Word Japanese Speech Recognition System," *Proceedings of ICASSP*, May 1991, pp. 717–720.

Y. Gong et al., "Continuous Speech Recognition Based On High Plausibility Regions," *Proceedings of ICASSP*, May 1991, pp. 725–728.

C. H. Coker, "Morphology and Rhyming: Two Powerful alternatives to Letter–to–Sound Rules for Speech Synthesis," *Proc. of the Workshop on Speech Synthes*, 1990, pp. 83–86.

*Primary Examiner*—Allen R. MacDonald
*Assistant Examiner*—Vijay B. Chawan
*Attorney, Agent, or Firm*—David M. Rosenblatt; Kenneth M. Brown

[57] ABSTRACT

A speech recognition system may be trained with data that is independent from previous acoustics. This method of training is quicker and more cost effective than previous training methods. In training the system, after a vocabulary word is input into the system, a first set of phonemes representative of the vocabulary word is determined. Next, the first set of phonemes is compared with a second set of phonemes representative of a second vocabulary word. The first vocabulary word and the second vocabulary word are different. The comparison generates a confusability index. The confusability index for the second word is a measure of the likelihood that the second word will be mistaken as another vocabulary word, e.g., the first word, already in the system. This process may be repeated for each newly desired vocabulary word.

6 Claims, 2 Drawing Sheets

CONFUSABLE WORD DETECTION IN SPEECH RECOGNITION

FIELD OF THE INVENTION:

The present invention relates to speech recognition systems. More particularly, the present invention relates to detecting confusable words used in speech recognition systems.

BACKGROUND OF THE INVENTION:

A speech recognition system responds to a person's speech by identifying a word within the speech. Sometimes, the word is the only word spoken by the person. In other instances, the word may be contained within a stream of speech from the person. The speech recognizers in the latter case are generally described as continuous.

Speech recognition systems may be used to control services. Thus, once the word is identified, the speech recognition system performs a function based upon the word. For example, for particular telephone calls, a caller may be prompted to state "collect," "credit card," "calling card," or "person to person." Based upon the caller's response, the speech recognition system initiates the appropriate connection and bills the appropriate party.

A problem with speech recognition systems is the ability to discern the difference between words that are acoustically similar or confusable. Thus, in order to identify a word, the speech recognition system must first be trained to distinguish a candidate words from other words.

A known method of training a speech recognition system includes speaking into the system and conducting comparisons based upon speech. (L. R. Bahl et al., Constructing Groups of Acoustically Confusable Words, IEEE International Conference On Acoustics, Speech, and Signal Processing (ICASSP) April 1990 pages 85-14 88.) For example, many people may speak word 1 into the system. The system develops a first model representative of the spoken input (word 1). Next, many people speak word 2 into the system. If word 2 is not confusable with the first model, a second model representative of word 2 is developed. Next, many people speak word 3 into the system. If word 3 is not confusable with the first model or the second model, a third model representative of word 3 is developed. This process continues until all words have been modelled.

The known method has many shortcomings. For example, there is a large cost associated with hiring many speakers necessary to train the system. Also, training the system with numerous speakers takes a great deal of time. One may seek to minimize the cost and time associated with training the system. However, if this is done, the resulting trained system is speaker dependent as it may account for only one dialect and/or other speaker dependent characteristics.

There is a need for an easily trainable, cost-effective speech recognition system.

SUMMARY OF THE INVENTION:

We have invented an easily trainable, cost-effective speech recognition system. As used in this applicaton, "training" comprises the creation of models for vocabulary words. In certain circumsatnces, training may also include the selection of certain vocabulary words. The speech recognition system may be trained with data (e.g., a vocabulary word) that is independent from previous acoustics. In training the system, after a vocabulary word is input into the system, a first set of phonemes representative of the vocabulary word is determined. Next, the first set of phonemes is compared with a second set of phonemes representative of a second vocabulary word. The first vocabulary word and the second vocabulary word are different. The comparison generates a confusability index. The confusability index for the second word is a measure of the likelihood that the second word will be mistaken as another vocabulary word, e.g., the first word, already in the system. This process may be repeated for each newly desired vocabulary word.

Advantageously, the invention enables one to easily train a speech recognition system that will have a high degree of accuracy because there are fewer confusable words in the set of vocabulary words.

Advantageously, the invention enables one to easily train a speech recognition system while checking for confusable words in a manner that is substantially more cost effective than previous methods.

Also advantageously, the invention enables one to easily train a speech recognition system while checking for confusable words in a manner that is substantially faster than previous methods.

Other advantages of the present invention will become apparent from the drawings and detailed description that follow.

DETAILED DESCRIPTION:

For clarity of explanation, the illustrative embodiment of the present invention is presented as comprising individual functional blocks. The functions these blocks represent may be provided through the use of either shared or dedicated hardware, including, but not limited to, hardware capable of executing software. For example, the functions of blocks 406 and 408 in FIG. 4 may be provided by a single shared processor. Use of the term "processor" should not be construed to refer exclusively to hardware capable of executing software.

Illustrative embodiments may comprise digital signal processor (DSP) hardware such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

Prior to describing the present invention, two known methods of training speech recognition system will be briefly described.

Figure 1:
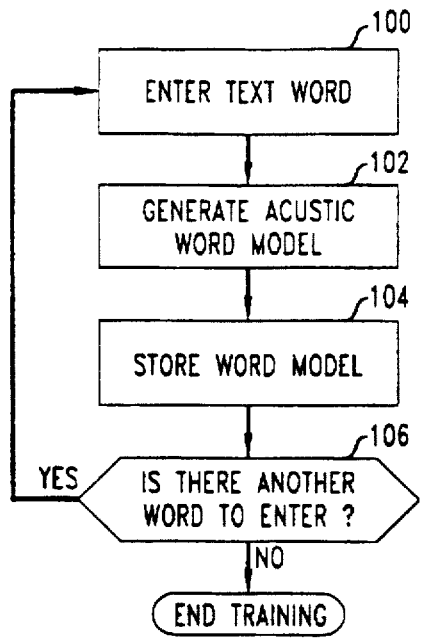
FIG. 1 shows a flowchart representative of a first known method for training a speech recognition system.

Referring to FIG. 1, in function block 100 a word is entered in text form. Based upon the text word, the system generates a word acoustic model in function block 102. Next, the system stores the word model that was generated in function block 102. This is shown in function block 104. After a word has been entered and its model stored, the system asks the user or trainer, as shown in function block 106, whether another word will be entered. If the answer is "yes," the process is repeated. If the answer is "no," the training is complete. A system similar to FIG. 1 is described in U.S. Pat. No. 5,329,608 by Bocchieri et al entitled "Automatic Speech Recognizer." This patent is assigned to the assignee of the present invention an is hereby incorporated by reference as if set forth in its entirety.

Figure 2:
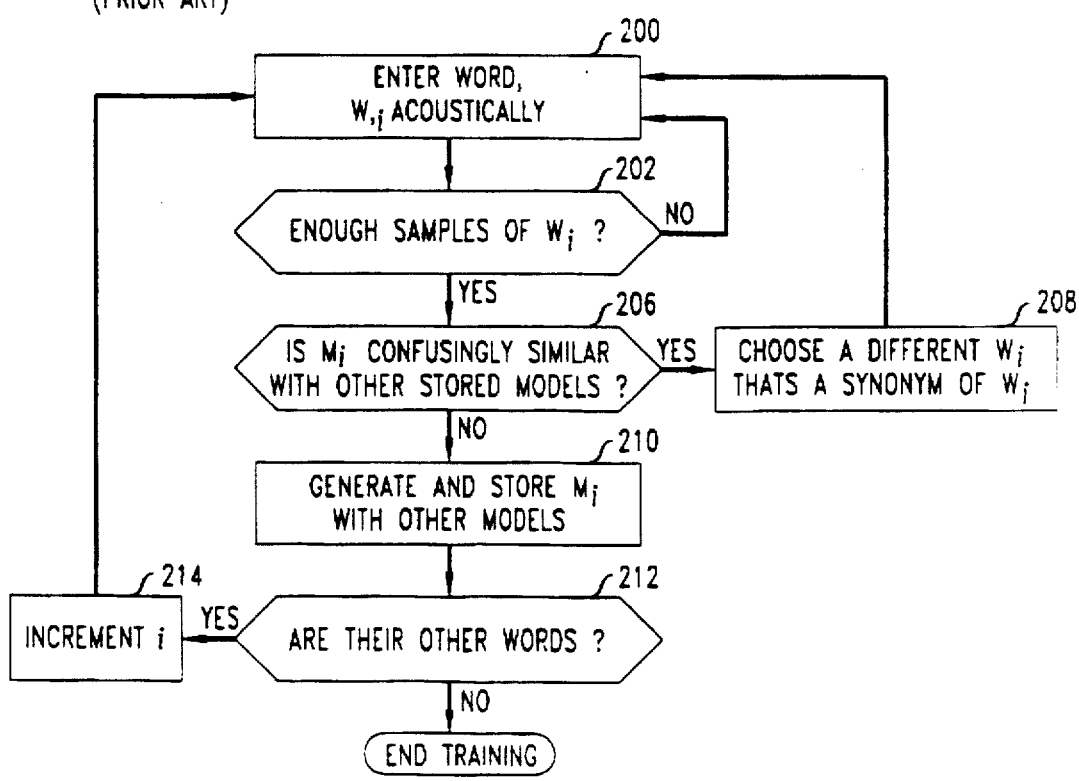
FIG. 2 shows a flowchart representative of a second known method for training a speech recognition system.

Referring to FIG. 2, in function block 200 a word, $W_1$, is entered into the system in an acoustic fashion. However, typically, the system does not yet generate a model for the word. This is because in order for a system to be able to generate a workable model for a word entered in an acoustic fashion, the system needs approximately 100 entries of the same word, $W_1$. Additionally, the system compares multiple samples of the word with previously stored models. Via function block 202, the system determines if enough samples of $W_1$ have been acoustically entered. If enough samples have not been acoustically entered, the system prompts the trainer(s) for additional samples of $W_1$. However, if enough samples have been acoustically entered, the system determines, via function box 206, if $W_1$ is confusingly similar to any currently stored models. It does this by comparing the samples of $W_1$ to every stored model. If $W_1$ is confusingly similar to a stored model, the system prompts the trainer to choose a different $W_1$ that is a synonym of $W_1$. The different $W_1$ replaces the previous $W_1$ and the training process continues. This prompting is performed via functional block 208. However, if $W_1$ is not confusingly similar to any currently stored model, a model representing the samples of $W_1$, namely $M_1$, is generated and stored with other models via function block 210. Next, function block 212 determines if there are other words to enter. If there are other words to enter, the value of "i" in incremented (e.g., i=i+1) and the system, via function block 214, prompts the trainer for entry of the next word. If there are no other words to enter, the system, via function block 216, ends the training. This process continues until all words have been modelled.

Having described the operation of known systems, the present invention will be described with reference to the training of a speech recognition system. Finally, use of the trained system will be described.

Figure 3:
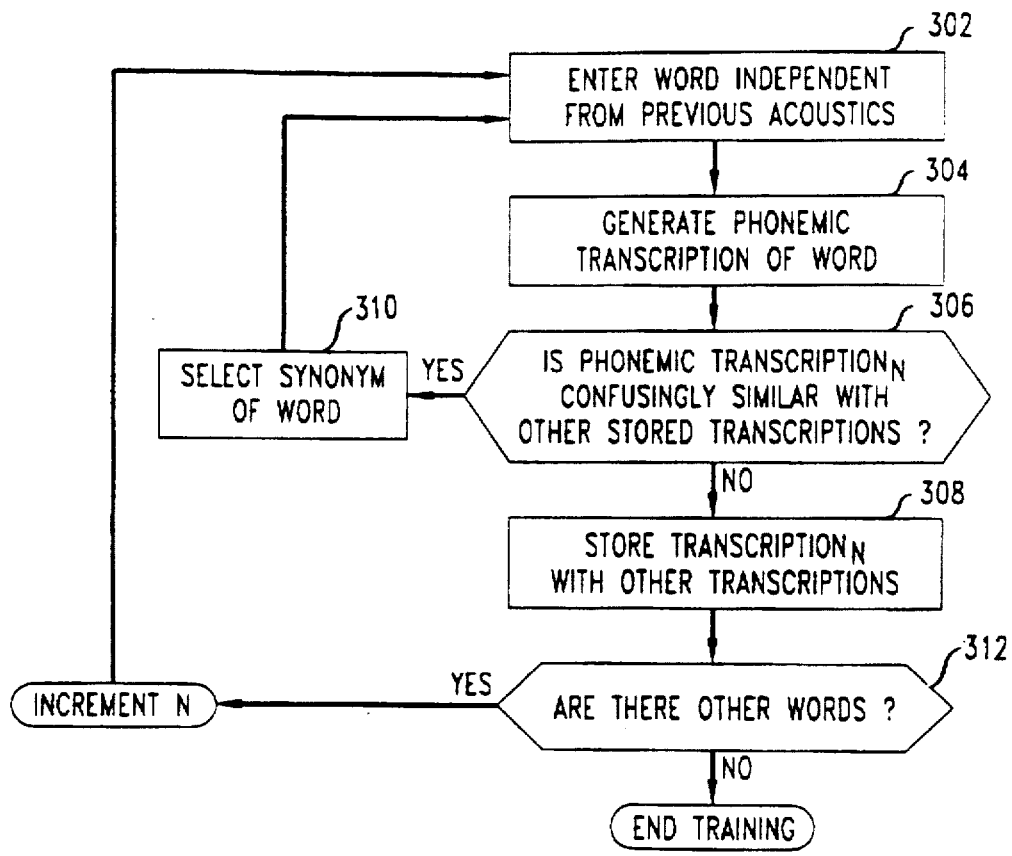
FIG. 3 shows a flowchart representative of method of training a speech recognition system performed in accordance with the present invention.

Referring to FIG. 3, a flowchart is shown that is representative of method of training a speech recognition system in accordance with the present invention. First, a first word (i.e., a first vocabulary word), $W_1$, is input, via function block 302, into a speech recognition unit training system in a manner independent from previous acoustic events. In other words, the word may be entered in any manner that does not include an acoustic representation (That is, the word is not entered by its being either spoken provided by a speech recording, or generated via, e.g., a text-to-speech system). Preferably, the word would be entered via a keyboard or read in from a text file. Previously mentioned U.S. Pat. No. 5,329,608 describes a system in which words are entered in text format.

Again referring to FIG. 3, next, function block 304 generates a phonemic transcription, $T_1$, of $W_1$. For example, "eight" is comprised of two phonemes, namely, the "ay" and "t" phonemes. The phonemic transcription is "ay" "t" In other words, the phonemic transcription is simply a concatenation of the two phonemes. Generating the phonemic transcription may be accomplished in a number of different ways well known to those skilled in the art. One such way is described in Coker, C., "A dictionary-intensive letter-to-sound program," J. Acoust. Soc. Am., Vol. 78, Suppl. 1, S7, 1985. This is described in more detail in Coker, C., et al. "Morphology and rhyming: two powerful alternatives to letter-to-sound rules", Proc. ESCA Workshop on Speech Synthesis, Autran, France, September, 1990.

Referring again to FIG. 3, typically, function block 306 would compare $T_1$ with the phonemic transcriptions of other words stored in a library of phonemic transcriptions. However, since $W_1$ is the first word entered, there are no phonemic transcriptions of other words to which to compare $T_1$ to see if it is confusingly similar. Thus, next, function block 308 stores $T_1$ in the library of phonemic transcriptions.

Still referring to FIG. 3, a second word, $W_2$, is input via function block 302. Next, function block 304 generates a phonemic transcription, $T_2$, of $W_2$. Next, function block 306 compares $T_2$ with the phonemic transcriptions of other words (e.g., $T_1$) stored in a library of phonemic transcriptions to see if it is confusingly similar with the phonemic transcriptions of other words. In order to check if $T_2$ is confusingly similar with $T_1$, the equation:

$$\rho_{1,2} \equiv \sum_{allT} \sqrt{P(T/T_1) \times P(T/T_2)}$$

may be used wherein $\rho_{1,2}$ is a Bhattacharyya coefficient approximating the probability of confusion between $W_1$ and $W_2$. $P(T/T_1)$ is the probability of recognizing a phonetic transcription T given an acoustic utterance of $T_1$, and $P(T/T_2)$ is the probability of recognizing a phonetic transcription T given an acoustic utterance of word 2. As is well known by those skilled in the art, general phoneme confusions, $P(T/T_i)$, are easily pre-tabulated with a subword unit recognizer. See Waardenburg, T., Du Preez, J. A., and Coetzer, M. W., "The Automatic Recognition Of Stop Consonants Using Hidden Markov Models," Proceedings of ICASSP '92, pages 585–588 (1992).

An example of how the equation operates to identify confusable words is shown below where $W_1$ is "eight" and $W_2$ is "wait." In this case, $T_1$ is "ay" "t" and "w" "ay" "t" is $T_2$. Application of the equation in the above paragraph results in a determination that the probability of confusion between "eight" and "wait" is 22%. The numbers appearing in TABLE I below have only a few non-zero entries for simplicity and clarity of illustration.

TABLE I

| T | $P(T/T_1)$ | $P(T/T_2)$ | Product |
|---|---|---|---|
| "ay" | 0.0 | 0.0 | 0.0 |
| "b" | 0.0 | 0.0 | 0.0 |
| . | . | . | . |
| . | . | . | . |
| "i" "t" | 0.5 | 0.0 | 0.0 |
| "ay" "t" | 0.5 | 0.1 | 0.05 |
| "w" "ay" "t" | 0.0 | 0.9 | 0.0 |
| | | | Sum = 0.05 |

In this example, there is only one product of P ($T/T_1$) and P ($T/T_2$) that has a non-zero value (i.e., 0.05). The square root of this product is equal to 0.22. Thus, when one adds the square roots of the non-zero products, one gets 0.22. This means that in this hypothetical example, there is a 22% chance that "wait" will be confused with a "eight." Note that this example assumes that the word "eight" will only ever be associated with two recognizer transcriptions, namely "i" "t" and "ay" "t" and that each association will occur 50% of the time. Note also that this example assumes that the word "wait" will only ever be associated with two recognizer transcriptions, namely "w" "ay" "t" 90% of the time and "at" "t" 10% of the time.

Again referring to FIG. 3, more generally, the Nth phonemic transcription, $T_N$, should be compared to all other phonemic transcriptions stored, namely $T_1$ to $T_{N-1}$, and the values summed. This may be done be implementing the equation:

$$\rho_N \equiv \sum_{j=1 \text{ to } N-1} \sum_{allT} \sqrt{P(T|T_j) \times P(T|T_N)}$$

Having described the general case of evaluating confusability, the remainder of the method will now be described.

Still referring to FIG. 3, if $\rho_N$ is above a certain threshold value, then $\rho_N$ is "confusable" with other stored phonemic transcriptions and the system, via function block 310, asks the trainer of the system for a synonym for $W_N$. This may be done by asking the trainer to enter in (e.g., by typing in) another word or it may provide the user with a list of synonyms from which the trainer may choose. However, if $\rho_N$ is not deemed to be "confusable" with other stored phonemic transcriptions, the transcription of $W_N$, namely $T_N$, will be stored along with the other transcriptions for future comparison to word candidates during training. If, in fact, there are other candidate words as determined by function block 312, the value of N is incremented (i.e., N=N+1) and the process is repeated. Otherwise, the training is complete for the time being.

Figure 4:
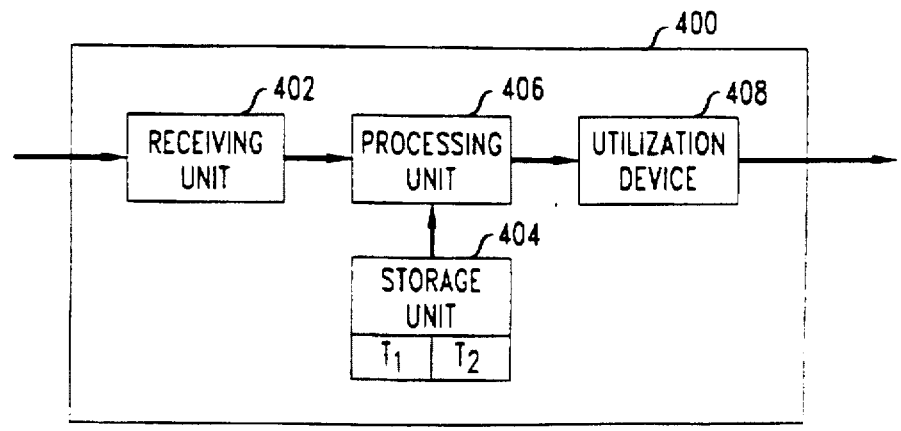
FIG. 4 shows a system that has been trained in accordance with the present invention.

Referring to FIG. 4, a system that has been trained in accordance with the method described with reference to FIG. 3 is described. The system 400 is comprised of a receiving unit 402, a storage unit 404, a processing unit 406, and a utilization device 408 all interconnected as shown. The receiving unit 402 may be a microphone. The storage 404 unit may be any storage unit that is large enough to store the phonemic transcriptions of words in which the system is interested in recognizing (e.g., a disk or a portion thereof, etc.). The processing unit 406, typically a digital signal processor, may be any type of processor based unit capable of comparing stored phonemic transcriptions to processed audio signals that are received. The methods of processing audio signal for speech recognition and of comparing the processed signals to stored phonemic transcriptions are well known in the art. The utilization device 408 takes as its input an output of the processing unit 406. The task means may, based upon its input, send data to another device, perform a certain task locally, prompt the user/speaker to make another entry, and/or perform a variety of other tasks well known in the art that are associated with speech recognition units. Other types of receiving units 402, a storage units 404, a processing units 406, and task means 408 will be well known to those skilled in the art.

Although the invention has been described with respect to a speech recognition system and the training thereof, those skilled in the art will realize that the descriptions above are for purposes of illustration. Many variations to the above description will be apparent to those skilled in the art. For example, even though the "product" column in TABLE I only has one non-zero entry (i.e., the "sum" is equal to the value of the one non-zero entry), there may be more than one non-zero entry that contributes to the sum to which the threshold is compared. Also, one need not compare the threshold to the "sum." Instead, one could have a threshold to which each individual non-zero entry in the "product" column is compared. In this case, if any particular non-zero entry was above a certain threshold, the trainer may be prompted to enter another word. Further, there are approximations other than the Bhattacharyya coefficient that can be used such as the more general Chernoff coefficient. Additionally, an exact computation of the probability of error could be performed. Those skilled in the art will also realize that certain applications may require the use of two words that have been deemed confusable with each other and that an "override" provision which would allow the system to use both words could be easily implemented by known methods. If the override provision is used, the system may then take advantage of discriminant training in order to provide better results. Due to the fact that there are many variations of the present invention, those skilled in the art will realize that the invention is defined by the appended claims.

What we claim is:

1. A method comprising the steps of:

(a) inputting a first vocabulary word in a form independent of previous acoustics into a speech recognition unit training system;

(b) determining a first set of phonemes representative of the first vocabulary word; and (c) comparing the first set of phonemes with a second set of phonemes representative of a second vocabulary word to determine a confusability index, the first vocabulary word and the second vocabulary word being different.

2. The method of claim 1 wherein the first set of phonemes is comprised of a first set of phonemic transcriptions and the second set of phonemes is comprised of a second set of phonemic transcriptions.

3. The method of claim 2 wherein the step of inputting the first vocabulary word in a form independent of previous acoustics comprises typing in a first vocabulary word.

4. The method of claim 2 wherein the step of inputting the first vocabulary word in a form independent of previous acoustics comprises reading in the vocabulary word from a text file.

5. The method of claim 1 further comprising the steps of:

(a) determining a relationship between the confusability index and a threshold value;

(b) if the relationship may by characterized a particular way, storing the first set of phonemes; and (c) determining if other vocabulary words need to be input.

6. A method of training a speech recognition system comprising:

(a) receiving a signal representing a first set of one or more characters;

(b) converting the first set to an acoustic representation of the first set;

(c) comparing the acoustic representation of the first set with a second acoustic representation to determine a confusability index, the second acoustic representation being of a second set of one or more characters, the first set of characters and the second set of characters being different.

\* \* \* \* \*